United States Patent Office 3,294,831
Patented Dec. 27, 1966

3,294,831
ARYLATION OF SILICON-CONTAINING
AROMATIC COMPOUNDS
Ernest Bryson McCall, Llangollen, and Brian Beard Millward, Wrexham, Wales, assignors to Monsanto Chemicals Limited, London, England, a British company
No Drawing. Filed Sept. 26, 1962, Ser. No. 226,463
Claims priority, application Great Britain, Oct. 17, 1961, 37,167/61
10 Claims. (Cl. 260—448.2)

This invention relates to a new process by which a silicon-containing compound can be arylated.

By arylation of a compound is meant the introduction of an aromatic group, that is to say the group remaining on removal of a nuclear hydrogen atom from a cyclic system that is stabilized by non-localized $\pi$-electrons, for instance, a phenyl group or a pyridyl group. A variety of compounds can be arylated in this way, and a slightly less usual instance of an arylation is the introduction of a phenyl group into a silicon-containing compound, for example, the introduction of a phenyl group into phenyl silicate to produce a diphenyl silicate.

Silicon-containing aromatic compounds are useful in a variety of applications, such as in hydraulic fluids, heat transfer media, and lubricants. The process which has now been discovered provides a means of modifying the properties of a silicon-containing aromatic compound so that, in certain instances, the temperature range over which it can be employed as a functional fluid or lubricant is extended, or, for example, its resistance to hydrolysis is increased.

The process of the invention is one for the arylation of a silicon-containing aromatic compound, in which said compound is heated with an arylating agent that is an aromatic substance containing, linked to a nuclear carbon atom, a sulfonyl halide group, a sulfonic acid group, or a sulfonic acid group in the form of a salt that decomposes at the reaction temperature.

The range of silicon-containing aromatic compounds which can be arylated by the process of the invention includes, for example, silanes and substituted silanes (for instance, halogenosilanes) and siloxanes (for instance, silicates and silicones). Certain of these compounds, for example, the halogenosilanes, are usually employed as intermediates in the production of others, such as silicates and silicones, rather than being themselves used as functional fluids.

Particularly excellent results are obtained in the process when the substance employed as the arylating agent is an aromatic sulfonyl halide, particularly a chloride or bromide.

The process is normally carried out at an elevated temperature, for example, a temperature higher than 125° C., and preferably above 150° C. or 175° C. Good results are obtained using a reaction temperature in the range of 200° C. to 350° C., for instance, between 250° C. and 300° C. In practice, the requirement as to reaction temperature means that the process is particularly convenient for the arylation of silicon-containing aromatic compounds that are relatively high boiling, for example, tetraphenyl orthosilicate. In the instance of more volatile compounds, however, a high reaction temperature can be obtained by carrying out the process under a suitably elevated pressure.

The silicon-containing aromatic compounds that can be arylated include those where the aromatic system is carbocyclic, for instance, a phenyl or naphthyl group, and those where it is heterocyclic, for instance, a furyl or thienyl group. A heterocyclic aromatic system can be one having a nitrogen atom as a member of the ring, but where the system is basic, for instance a pyridyl group, unwanted side reactions are likely to occur, and the process is therefore less useful in respect of compounds containing such system. More than one aromatic ring can be present in the compound; for instance, the compound can be an aryloxyarylsilane or an arylthienyldihalosilane. Where this is so, arylation can take place in all or any of the rings.

In general, the aromatic system can contain a substituent, for example an aliphatic group, for instance an alkyl group such as methyl, propyl, amyl or dodecyl; a cycloalkyl group such as cyclohexyl; an aralkyl group such as benzyl; an alkoxy group such as methoxy or ethoxy; a halogen atom such as chlorine or bromine; or a carboxylic ester group such as an ethoxycarbonyl group.

A silicon-containing aromatic compound can moreover contain a non-aromatic group, for example an aliphatic group such as a lower alkyl, other than one that is a substituent in the aromatic system, for instance one that is linked to a silicon atom.

Where the silicon-containing aromatic compound is a silicate, this includes the orthosilicates as well as the polysilicate esters (that is to say, the condensed silicates or silicones). The orthosilicates can be illustrated by the formula

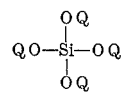

wherein each Q is selected from the class consisting of phenyl, lower alkylphenyl, chlorophenyl, naphthyl and phenoxyphenyl.

Aromatic silanes and halosilanes that can be arylated in the process of the invention are derivatives of $SiH_4$, $Si_2H_6$, and higher homologues where at least one hydrogen atom is replaced by an aromatic group, for example, an aryl or aryloxy group. In the halosilanes, at least one other hydrogen atom is replaced by a halogen atom such as chlorine or bromine. The silanes can be illustrated by the formula

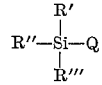

wherein R', R" and R''' are each selected from the class consisting of hydrogen, chlorine, bromine, lower alkyl and Q, and Q has the same meaning as above.

Where the silicon-containing aromatic compound is a siloxane, this can be one having a cyclic structure or a predominantly linear polysiloxane chain.

In general, the organic silicon-containing compounds which can be arylated most successfully are those where most or all the organic groups present are aromatic, for example, the tetra-aryl orthosilicates, triarylsilanes, triarylhalosilanes, and arylsilicones.

Specific examples of silicon-containing aromatic compounds which can be employed in the process of this invention include: tetraphenyl orthosilicate, tetra o-tolyl orthosilicate, tetra(p-chlorophenyl)orthosilicate, tetra(3-phenoxyphenyl)orthosilicate, triphenylsilane, diphenyl-di(3 - phenoxyphenyl)silane, phenyl-2 - thienyldi(2-phenoxyphenyl)silane, m - di(triphenylsiloxy)benzene, triphenylchlorosilane, triphenylbromosilane, phenyl-2-thienyldichlorosilane, tri(p-tolyl)chlorosilane, hexaphenylcyclotrisiloxane, phenyl silicone, tolyl silicone, xylyl silicone, and naphthyl silicone.

The arylating agent is a substance containing an aromatic radical linked by a nuclear carbon atom to one of the specified groups, for instance the sulfonyl halide group, and in principle the aromatic radical can be one derived from any of the aromatic systems referred to above which can be present in a silicon-containing aromatic compound capable of being arylated in the process of the invention. In practice, the arylating agent is often one containing a relatively simple aromatic radical, such as, for instance, a phenyl, lower alkylphenyl, chlorophenyl or nitrophenyl radical. However, the arylating agent can, in general, be one containing a carbocyclic aromatic radical such as phenyl or a condensed benzenoid radical such as naphthyl, or an aromatic radical having a heterocyclic ring such as a furyl, thienyl or pyridyl radical. More than one type of ring can be present; for instance, the radical can be benzothienyl, dibenzothienyl or quinolinyl. In general, the radical can contain a substituent, for example an aliphatic group, for instance an alkyl or cycloalkyl group, such as a methyl, octyl, nonyl or cyclohexyl group; an aromatic group, for instance an aryl group, such as a phenyl or tolyl group; a halogen atom, for example chlorine or bromine; a nitro group; a carboxylic ester group, for instance a carbethoxy group; an alkoxy group, for instance a methoxy, ethoxy, butoxy or hexyloxy group; or an aryloxy group, for instance a phenoxy or tolyloxy group.

In general, the arylating agent can contain one or more of the specified groups, that is to say a sulfonyl halide group, a sulfonic acid group, or a sulfonic acid group in the form of a salt that decomposes at the reaction temperature; of these, the sulfonyl halide group is preferred. The arylating agent can, for instance, be a benzenesulfonyl halide or a benzenedisulfonyl halide. An example of an arylating agent containing a sulfonic acid group in the form of a salt that decomposes in the process to a free sulfonic acid group is an ammonium salt of an aromatic sulfonic acid. Specific examples of arylating agents are benzenesulfonyl chloride, toluenesulfonyl chloride, isopropylbenzenesulfonyl chloride, t-butylbenzenesulfonyl chloride, p-nitrobenzenesulfonyl chloride, pyridine-3-sulfonyl chloride, p-phenylbenzenesulfonyl hcloride benzenesulfonyl bromide, m-benzenedisulfonyl chloride, 4,4'-diphenyldisulfonyl chloride, benzenesulfonic acid, naphthalenesulfonic acid, and ammonium benzenesulfonate.

The arylation reaction proceeds smoothly at the appropriate elevated temperature. Although it is not essential, a catalyst, for example one of the materials disclosed in copending application Serial No. 226,433, filed September 26, 1962, now Patent No. 3,244,721, can be employed. Neither is the presence of a solvent essential, although one can be employed if desired, particularly a high-boiling inert solvent such as, for instance, hexachlorobenzene or some other perhalogenated substance.

Good results are obtained when, relative to the quantity of the arylating agent, the quantity of the compound to be arylated in the process is large; the excess can, for example, be 5 to 25 times the molar equivalent, for instance about 10 to 20 times. However, a smaller excess, for example two or three times the molar equivalent, or equimolecular proportions, can be employed. Moreover, particularly where it is desired to arylate the compound in more than one position, it is sometimes appropriate to employ an excess of the arylating agent.

The product of the process of the invention is often a mixture of isomers and of mono- and poly-arylated compounds; appropriate arylation of tetraphenyl orthosilicate, for example, gives a mixture of o-, m- and p-diphenylyltriphenyl orthosilicate and bis(diphenylyl) diphenyl orthosilicate. In many instances, for example where the product is used as a functional fluid, it is not essential that such isomers or compounds should be separated from each other, but simply that they should be isolated as a mixture from unchanged starting materials. If necessary, however, it is normally practical to separate individual components of a mixture, for example by fractional crystallization or chromatography.

The process of the invention is illustrated by the following examples.

Example 1

This example describes the production of a mixture of diphenylyl phenyl silicates from benzenesulfonyl chloride and tetraphenyl orthosilicate.

A mixture of 19.7 cc. (0.154 mol.) of benzenesulfonyl chloride and 154 grams (0.314 mol.) of tetraphenyl orthosilicate was heated at about 280° C. The production of hydrogen chloride and sulfur dioxide which accompanied the arylation reaction ceased after four hours, and heating was then discontinued.

The product was distilled under reduced pressure, giving a fraction consisting largely of unreacted tetraphenyl orthosilicate followed by 25 grams of a mixture of diphenylyl phenyl silicates having a boiling range of 282° C. to 362° C. at 0.8 mm. of mercury pressure.

The fact that arylation of the phenyl groups had taken place was demonstrated by the fact that, on hydrolyzing a small portion of the product with aqueous potassium hydroxide, there was obtained a mixture of phenylphenols having a boiling range of 210-350° C.

Example 2

This example describes the production of a mixture of diphenylyl phenyl chlorosilanes from benzenesulfonyl chloride and triphenylchlorosilane.

A mixture of 10 cc. (0.08 mol.) of benzenesulfonyl chloride and 70 grams (0.24 mol.) of triphenylchlorosilane was heated at about 270° C. The production of hydrogen chloride and sulfur dioxide which accompanied the arylation reaction ceased after about 4½ hours, and heating was then discontinued.

Distillation of the product under reduced pressure separated the excess triphenylchlorosilane from the mixed diphenylyl phenyl chlorosilanes, which latter were obtained as a fraction (14.7 grams) having a boiling range of 200° C. to 290° C. at a pressure of 0.7 mm. of mercury.

The fact that arylation of the phenyl groups had taken place was demonstrated by the formation of diphenyl upon reacting a small portion of the product with acetic acid in the presence of sulfuric acid.

Example 3

This example describes the production of a mixture of bis(diphenylyl) and diphenylyl phenyl dichlorosilanes from benzenesulfonyl chloride and diphenyldichlorosilane.

A mixture of 5.1 cc. (0.04 mol.) of benzenesulfonyl chloride and 41.6 cc. (0.125 mol.) of diphenyldichlorosilane was heated to about 270° C. The production of hydrogen chloride and sulfur dioxide which accompanied the arylation reaction ceased after four hours, and heating was then discontinued.

The product was distilled under reduced pressure, giving a fraction consisting of unreacted diphenyldichlorosilane, followed by 7.5 grams of a mixture of bis(diphenylyl) and diphenylyl phenyl dichlorosilanes having a boiling range of 182-202° C. at 7 mm. of mercury pressure.

Example 4

This example describes the production of a mixture of diphenyltrichlorosilanes from benzenesulfonyl chloride and phenyltrichlorosilane.

A mixture of 7.7 cc. (0.06 mol.) of benzenesulfonyl chloride and 101.2 grams (0.48 mol.) of phenyltrichlorosilane was refluxed gently for 70 hours. The production of hydrogen chloride and sulfur dioxide which accompanied the arylation reaction almost ceased after this time. The product was distilled, giving a fraction consisting largely of unreacted starting materials followed by 10.4 grams of an isomeric mixture of diphenylyltrichlorosilanes having a boiling range of 220-330° C.

Following the procedural details which have been fully described in the preceding examples, other and different arylation products are obtained as hereinafter set forth. It will be understood that such products are also mixtures of the types noted above.

Example 5

A mixture of tri(p-tolyl)bromosilane and benzenesulfonyl bromide is heated in the manner set forth above. There is obtained a mixture of tri(methyldiphenylyl) and methyldiphenylyl p-tolyl bromosilanes. Arylation is verified by the procedures already described.

Example 6

A mixture of tetra(phenoxyphenyl) orthosilicate and benzenesulfonic acid is heated in the manner set forth above. There is obtained a mixture of phenylated phenoxyphenyl orthosilicates. Arylation is verified by the procedures already described.

Example 7

A mixture of diethyldiphenylsilane and nitrobenzenesulfonic acid is heated in the manner set forth above. There is obtained a mixture of bis(nitrodiphenylyl) and nitrodiphenylyl phenyl diethylsilanes. Arylation is verified by the procedures already described.

Example 8

A mixture of naphthyldichlorosilane and ammonium benzenesulfonate is heated in the manner set forth above. There is obtained an isomeric mixture of (phenylnaphthyl)dichlorosilanes. Arylation is verified by the procedures already described.

Example 9

A mixture of triphenylmethylsilane and toluenesulfonyl chloride is heated in the manner set forth above. There is obtained a mixture of tri(methyldiphenylyl) and methyldiphenylyl phenyl methylsilanes. Arylation is verified by the procedures already described.

Example 10

A mixture of tetra(chlorophenyl) orthosilicate and chlorobenzenesulfonyl chloride is heated in the manner set forth above. There is obtained a mixture of tetra-dichlorodiphenylyl) and dichlorodiphenylyl chlorophenyl orthosilicates. Arylation is verified by the procedures already described.

While the invention has been described herein with regard to several specific embodiments, it is not so limited. It is to be understood that modifications and variations, obvious to those skilled in the art, may be made without departing from the spirit and scope of the invention.

The embodiments of the invention in which an exclusive property or privilege is claimed are defined as follows:

1. A process for arylating an aromatic silicon-containing compound which comprises heating a compound selected from the class consisting of

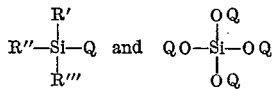

where R', R" and R''' are each selected from the class consisting of hydrogen, chlorine, bromine, lower alkyl and Q, and each Q is selected from the class consisting of phenyl, lower alkylphenyl, chlorophenyl, naphthyl and phenoxyphenyl, with a compound of the formula $RSO_2X$ where R is selected from the class consisting of phenyl, lower alkylphenyl, chlorophenyl and nitrophenyl, X is halogen and the sulfonyl halide moiety is attached to a nuclear carbon atom of R.

2. A process as defined in claim 1 wherein the reaction is carried out at a temperature of from about 125° C. to about 350° C.

3. A process as defined in claim 1 wherein the silicon-containing compound is tetraphenyl orthosilicate.

4. A process as defined in claim 1 wherein the silicon-containing compound is triphenyl chlorosilane.

5. A process as defined in claim 1 wherein the silicon-containing compound is diphenyl dichlorosilane.

6. A process as defined in claim 1 wherein the silicon-containing compound is phenyl trichlorosilane.

7. A process as defined in claim 1 wherein tetraphenyl orthosilicate is heated with benzenesulfonyl chloride.

8. A process as defined in claim 1 wherein triphenyl chlorosilane is heated with benzenesulfonyl chloride.

9. A process as defined in claim 1 wherein phenyl trichlorosilane is heated with benzenesulfonyl chloride.

10. A process as defined in claim 1 wherein diphenyl dichlorosilane is heated with benzenesulfonyl chloride.

References Cited by the Examiner

UNITED STATES PATENTS 2,957,781   10/1960   Bailey et al. _____ 260—448.2

FOREIGN PATENTS 230,537   9/1960   Australia.

HELEN M. McCARTHY, *Primary Examiner.*

SAMUEL H. BLECH, TOBIAS E. LEVOW, *Examiners.*

J. G. LEVITT, *Assistant Examiner.*